United States Patent [19]

Sasaki

[11] Patent Number: 5,029,611

[45] Date of Patent: Jul. 9, 1991

[54] FUEL SUCTION SYSTEM

[75] Inventor: Michiaki Sasaki, Kanagawa, Japan

[73] Assignee: Nissan Motor Company, Limited, Yokohama, Japan

[21] Appl. No.: 421,110

[22] Filed: Oct. 13, 1989

[30] Foreign Application Priority Data

Oct. 14, 1988 [JP] Japan .......................... 63-134230[U]

[51] Int. Cl.$^5$ ...................... B60K 15/06; F02M 37/10
[52] U.S. Cl. ................................. 137/574; 137/576; 123/514
[58] Field of Search ............... 137/571, 574, 576, 264; 123/514, 516

[56] References Cited

U.S. PATENT DOCUMENTS

| | | | |
|---|---|---|---|
| 2,767,736 | 10/1956 | Lackinger | 137/574 |
| 3,020,950 | 2/1962 | Schraivogel | 137/574 X |
| 3,049,171 | 8/1962 | Neuerburg | 137/574 X |
| 3,881,457 | 5/1975 | Benner et al. | 123/136 |
| 4,178,004 | 12/1979 | Shinoda et al. | 137/576 X |
| 4,354,521 | 10/1982 | Harde | 137/574 X |
| 4,397,333 | 8/1983 | Liba et al. | 137/574 |
| 4,453,564 | 6/1984 | Bergesio | 137/574 |
| 4,503,885 | 3/1985 | Hall | 137/574 |
| 4,638,836 | 1/1987 | Bailey | 137/574 |
| 4,669,501 | 6/1987 | Takahashi | 137/574 |
| 4,842,006 | 6/1989 | Scheuienbrand | 137/574 X |

FOREIGN PATENT DOCUMENTS 51-13423 1/1976 Japan .

Primary Examiner—John Rivell
Attorney, Agent, or Firm—Foley & Lardner

[57] ABSTRACT

A fuel supply apparatus for an internal combustion engine disposed in the fuel tank of automotive vehicles including a reservoir container on the tank bottom, a feed conduit through which the fuel is suctioned from the fuel tank 1 a return conduit through which excess fuel returned to the tank from the engine, and two inlet conduits. The first inlet conduit extends diagonally across the tank bottom having the first opening on the container wall and the first open end spaced about 180° opposite the side of container where the first opening is opened. The second inlet conduit extends along the container wall having the second open end opened adjacent the corner diagonally opposite the first open end and opening on the wall located about 180° opposite the second open end. The outlet port of the return conduit extends adjacent the open end of the first inlet conduit and forms an ejector portion with the open end.

10 Claims, 2 Drawing Sheets front direction

FUEL SUCTION SYSTEM

BACKGROUND OF THE INVENTION

1. Technical Field

This invention relates to a fuel suction system for supplying fuel from a fuel tank to an internal combustion engine used in an automotive vehicle.

2. Background Art

Conventionally, fuel in the fuel tank of automotive vehicles has been suctioned by a feed conduit installed in the tank, then transferred to the internal combustion engine. When the vehicle is driven around a curve or at an incline continuously or for a long time, fuel inclines to one side of the tank. It becomes unable to be suctioned by the feed conduit when the level of fuel in the fuel tank drops to a relatively low level. This causes engine malfunctions, stalling or discontinuous combustion.

U.S. Pat No. 3,881,457 issued to Benner et al. and U.S. Pat. No. 4,503,885 issued to Hall describe a fuel tank including a reservoir container surrounding a feed conduit supported on the bottom of the tank. Fuel can be stored in the reservoir container even the level of fuel in the tank becomes relatively low. However, the feed conduit cannot suction fuel when it is inclined substantially to one side of the tank.

It has been proposed, for example, in Japanese Utility Model Kokai No. 51-13423 to install a reservoir container having its vertical wall cut out on one side at the tank bottom. Fuel would flow into the container over the cut-out side of the wall. When the fuel surface inclines in the tank, stored fuel in the container below the cut out level does not flow out and is suctioned by the inlet conduit to the engine. However, because the fuel supply depends on the stored fuel in the container only, discontinuous combustion of the engine is caused sometimes. Thus, the automotive vehicle becomes undrivable, and the remainder of the fuel cannot be utilized efficiently.

Therefore, it is an object of the present invention to provide a fuel suction system for internal combustion engines used in automotive vehicles which can transfer the remainder of the fuel in the fuel tank to the engine efficiently even if the driven state of the vehicle is inclined to one side for a long time, the efficient functioning of the tank is maintained even when the level of fuel drops to a relatively low level.

SUMMARY OF THE INVENTION

It has been required for the fuel tank of the automotive vehicle to have the ability to transfer fuel from the tank to the engine when the vehicle inclines for a long time and the remaining fuel is relatively low.

According to the present invention, there is provided; a fuel suction system including a fuel tank, a feed conduit through which fuel is suctioned from the fuel tank, a reservoir container in the tank mounted on the tank bottom surrounding the feed conduit, and a return conduit through which excess fuel is returned to the fuel tank. The reservoir container has two openings on its wall. The first opening on the wall connects the first inlet conduit extending along the surface of the container's wall and diagonally across the tank bottom. An open end of the first inlet conduit is adjacent a corner about 180° opposite the first opening space. The return conduit has an outlet port adjacent the open end of the first inlet conduit. The outlet port of the return conduit and the open end of the first inlet conduit form an ejector portion. On the other hand, the second opening is an additional opening located at a side about 180° opposite the second open end. This open end located adjacent the side wall of the tank at the corner diagonally opposite the corner where the first open end is spaced. Additionally, the second opening is located on a line through the center of the reservoir container which intersects line between the first open end and the first opening of the first inlet conduit.

With return fuel passing therethrough, the ejector portion suctions the remainder of surrounding fuel and then supplies it to the reservoir container with return fuel. In case of fuel inclines to one side of the tank when the automotive vehicle is driven through a curve or along a slope, fuel supplied to the reservoir container through either the first or second inlet conduit is ensured. Additionally, because both the first and the second openings are spaced opposite to each open end, no upstream flow of fuel occurs. Therefore, the continuous supplying of fuel to the tank (returned to and remaining in the tank) to the engine can be accomplished smoothly.

BRIEF DESCRIPTION OF THE DRAWINGS

The present invention will be understood more clearly from the preferred embodiment described herebelow and from the appended drawings which illustrate the detailed composition of the embodiment, which, however, should not be taken to limit the invention but are for explanation and understanding only.

In the drawings.

DETAILED DESCRIPTION OF THE PREFERRED EMBODIMENTS

Figure 1:
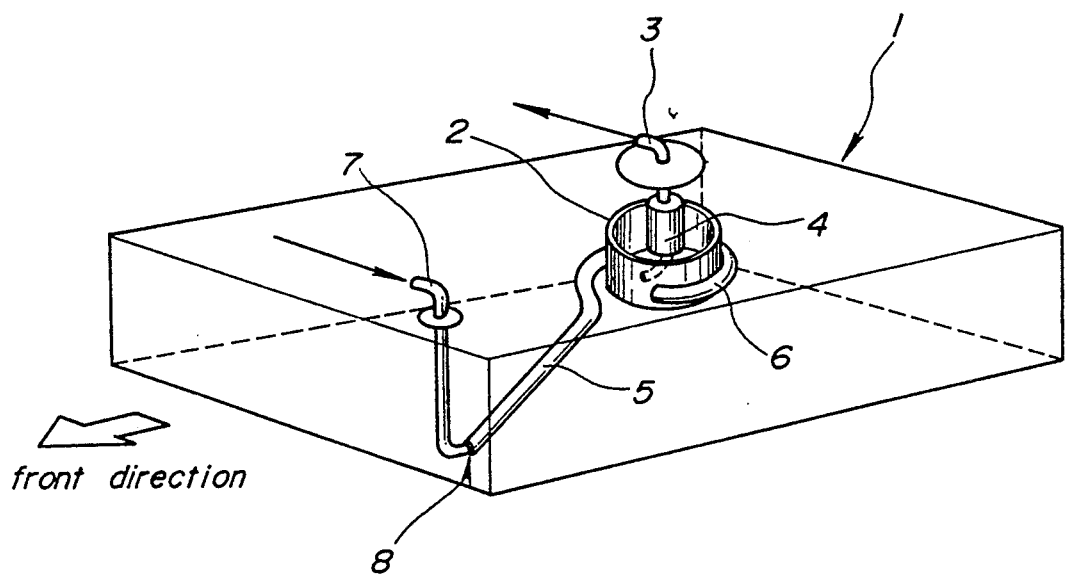
FIG. 1 is a perspective view of the one embodiment of the present invention.
Figure 2:
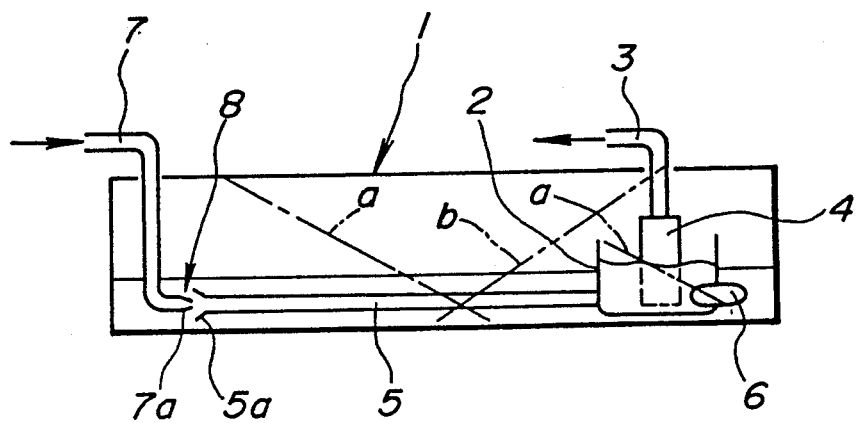
FIG. 2 is a sectional view of the same embodiment of FIG. 1.
Figure 3:
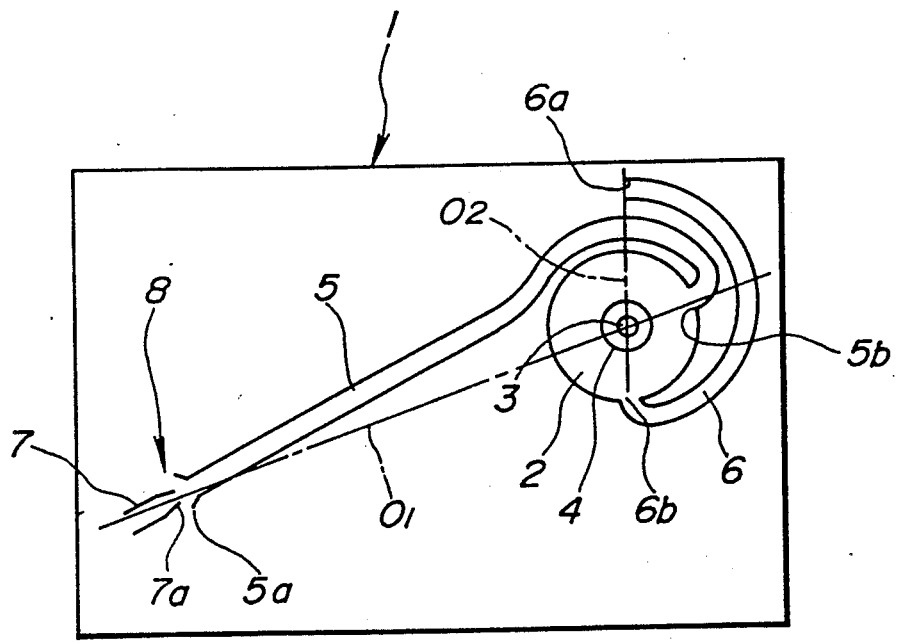
FIG. 3 is a plan view of the same embodiment of FIG. 1.

Referring now to FIGS. 1 to 3, the reservoir container 2 is fixed to the tank 1 adjacent one of the rear corners. For example, this preferred embodiment has the container 2 mounted on the right corner of the rear part of the tank 1. The feed conduit 3 is spaced in the container 2 penetrating a top wall of the tank 1. In this embodiment, a gas pump 4 is disposed below an open end of the feed conduit 3 adjacent to the bottom of the container 2 and it is fixed to the bottom of the container 2. The first inlet conduit 5 and the second inlet conduit 6 are fuel inlet conduits from the tank 1 to the container 2 spaced to form the reservoir container.

The first inlet conduit 5 has an open end 5a which is spaced on the diagonal corner of the bottom of the tank 1 away from where the container 2 is mounted. Therefore, in this embodiment, the open end 5a is opened on the left corner of the front part of the tank 1. It is a flared opening and forms ejector portion 8 with outlet port 7a of the return conduit 7, which penetrates the top wall of the tank 1 spaced adjacent the open end 5a. The first inlet conduit 5 extends from the first open end 5a diagonally across the tank bottom to the container wall followed along the wall surface then connects to the first opening 5b. The first opening is spaced on the wall side of the container 2 about 180° opposite the open end $5a$ on the line $0_1$ extending between the open end $5a$ and the container 2 (refer to FIG. 3).

On the other hand, the second inlet conduit 6 extends along the wall of the container 2 having an open end $6a$ which opened adjacent the corner where the container 2 is spaced. The second opening $6b$ is located at a side about 180° opposite the second open end $6a$. Additionally, it located on the line $0_2$ which intersected the line $0_1$ extending between the open end $5a$ and the opening $5b$. The line $0_2$ intersects the line $01$ through the center of the reservoir container 2 (refer to FIG. 3).

According to the construction as the above mentioned, when the vehicle is driven on a flat road, the fuel surrounding the ejector portion 8 is suctioned and induced by the first inlet conduit 5 with the fuel flow into the ejector portion 8 through the return conduit 7, because both of the first and second inlet conduits are immersed in the fuel. Concurrently, the fuel is suctioned and induced by the second inlet conduit 6.

When the vehicle goes down the slope or curves to the right, the fuel surface in the tank 1 and the reservoir container 2 incline as the line a shown in FIG. 2. Thus, the second open end $6a$ of the second inlet conduit 6 is exposed to the air on the fuel surface, the ejector portion 8 is immersed in the fuel. The fuel in the container 2 does not leak away from there because the first opening $5b$ of the first inlet conduit 5 is located on the opposite side of the fuel inclines. Thus, the remaining fuel in the tank 1 accompanied by the returning fuel via the return conduit is supplied to the container 2 via the ejector portion 8.

On the other hand, when the vehicle goes up the slope or curves to the left, the fuel surface in the tank 1 inclines as the line b shown in FIG. 2. The reservoir container 2 is immersed substantially in the inclined fuel in the tank 1. Though, the first open end $5a$ of the first inlet conduit 5 is exposed to the air on the fuel surface, the second open end $6a$ of the second inlet conduit 6 is immersed in fuel. Additionally, the fuel in the container 2 does not leak away from there because the second opening $6b$ of the second inlet conduit 6 is located to the opposite side of the fuel inclines. Thus, the remaining fuel in the tank 1 is supplied to the reservoir container 2 via the second inlet conduit 6 concurrently with the returning fuel discharged from the return conduit 7 supplied via the first inlet conduit 5 to the reservoir container 2.

Therefore, the fuel in the tank 1 is supplied to the container 2 continuously even if the fuel inclines to one side of the tank 1 for a long time when the level of the fuel is relatively low. The continuous supply of the fuel to the engine avoids discontinuous combustion or engine stopping.

What is claimed is:

1. A fuel suction system for a fuel tank having a reservoir container on a bottom of said tank, a feed conduit through which a fuel is suctioned from said fuel tank and a return conduit through which excess fuel is returned to the tank from an engine, comprising:
   a first inlet conduit having a first opening connected to said container and a first open end opened at a corner of the tank diagonally opposite said first opening, said first inlet conduit extending between said first opening and said first open end;
   a second inlet conduit having a second opening which connects said container and a second open end adjacent a corner diagonally opposite the corner where said first open end is opened, said second open end being located opposite the side where the second opening is located, said second inlet conduit extending between said second opening and said second open end.

2. The fuel suction system as set forth in claim 1, wherein said first opening of said first inlet conduit is located about 180° opposite said first open end of said first inlet conduit.

3. The fuel suction system as set forth in claim 1, wherein said second opening of said second inlet conduit is located about 180° opposite said second open end of said second inlet conduit.

4. The fuel suction system as set forth in claim 1, wherein said first open end of the first inlet conduit associates with an outlet port of the return conduit which terminates adjacent said first open end to form an ejector portion.

5. The fuel suction system as set forth in claim 4, wherein said reservoir container is located adjacent one corner of the tank bottom diagonally opposite a corner where said ejector portion is formed.

6. The fuel suction system as set forth in claim 5, wherein said first inlet conduit initially extends along a surface of a side wall of said container and then extends diagonally across said tank bottom.

7. The fuel suction system as set forth in claim 5, wherein said second inlet conduit extends along a said surface of a side wall of said container.

8. A fuel suction system for a fuel tank having a reservoir container on a bottom of said tank, a feed conduit through which a fuel is suctioned from said fuel tank and a return conduit through which excess fuel is returned to the tank from an engine, comprising:
   a first inlet conduit having a first opening connected to said container at an orientation adjacent a first corner of said tank and a first open end opened at an orientation adjacent a second corner of said tank which corner resides diagonally opposite said first corner;
   a second inlet conduit having a second opening connected to said container at an orientation adjacent the first corner and a second open end oriented at an orientation adjacent the first corner which is opposed to the orientation of the second opening;
   said first and second open ends being positioned within the tank so that one of said first and second open ends is always positioned at essentially the lowermost elevation in the tank when the tank is in other than the level position.

9. A fuel suction system for a fuel tank having a reservoir container within and near a side of the tank, a feed conduit through which fuel is suctioned from the fuel tank to an engine and a return conduit through which excess fuel is returned to the tank from the engine, comprising:
   a first inlet conduit for the intake of fuel to the engine, the first conduit having an open end at a location in the tank diametrically opposite said side of the tank, the other end of the first conduit communicating with the reservoir approximately 180° from the diametrically opposite location; and
   a second intake conduit for the intake of fuel to the engine, the second conduit having an open end proximate to said side of the tank, the other end of the second conduit communicating with the reservoir approximately 180° from the conduit open end.

10. A fuel suction system for a fuel tank having a reservoir container on a bottom of said tank, a feed conduit means through which a fuel is suctioned from said container and a return conduit means with an outlet nozzle through which excess fuel is returned to said tank from an engine, comprising:

a first inlet conduit having a first open end which communicates with said container and a second open end disposed at a first corner of said tank;

a second inlet conduit having a first open end which communicates with said container and a second open end spaced at a second corner opposite said first corner;

said second open end of the first inlet conduit being axially aligned with and terminating adjacent to the outlet nozzle so as to produce an ejecting portion.

* * * * *